No. 729,801. PATENTED JUNE 2, 1903.
C. B. SMITH.
TELEPHONE EXCHANGE SYSTEM.
APPLICATION FILED JUNE 25, 1901.
NO MODEL.
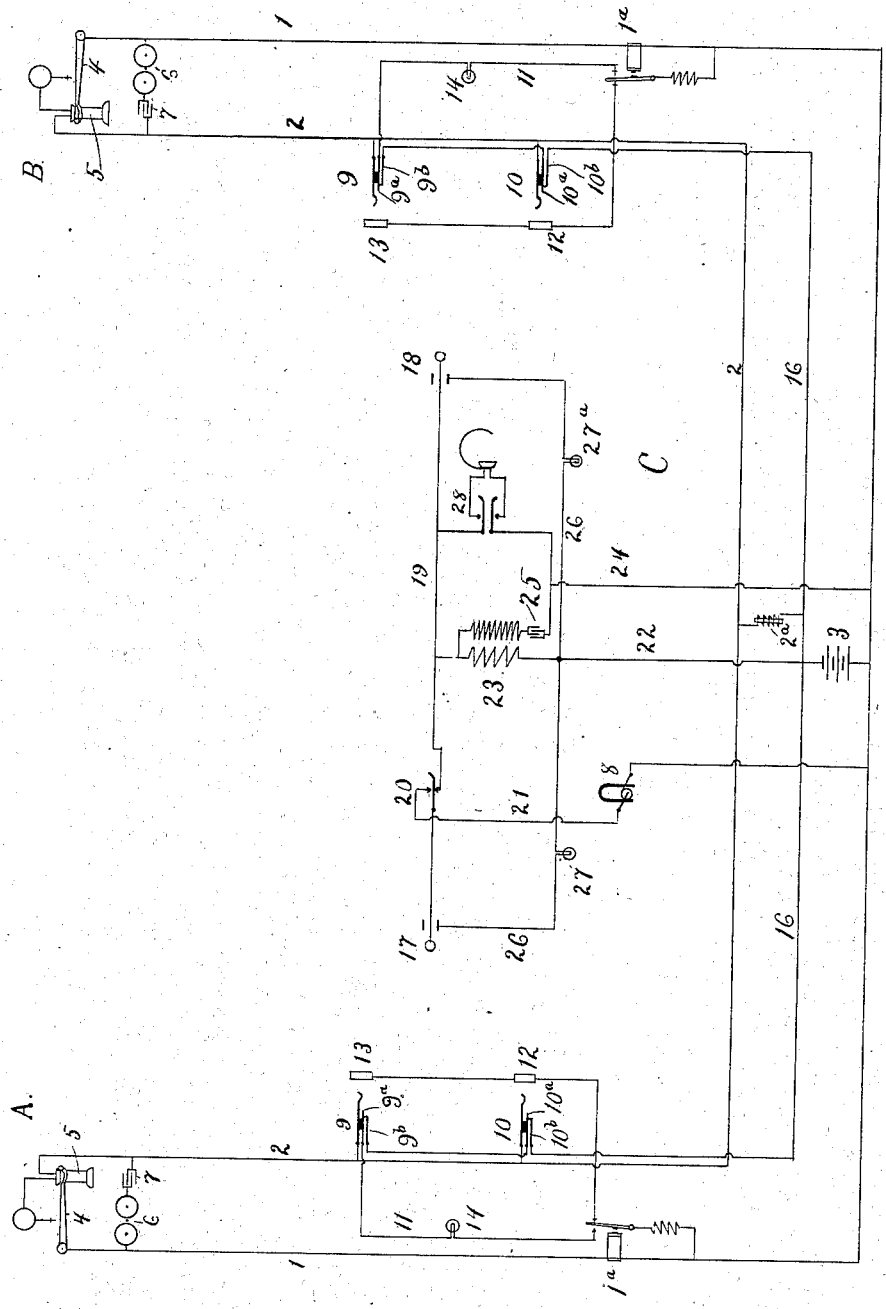
WITNESSES:
M. Manning
C. Heerbrandt
INVENTOR
Chas. B. Smith
BY
T. F. Bourne
his ATTORNEY No. 729,801. Patented June 2, 1903.

UNITED STATES PATENT OFFICE.

CHARLES B. SMITH, OF NEW YORK, N. Y.

TELEPHONE-EXCHANGE SYSTEM.

SPECIFICATION forming part of Letters Patent No. 729,801, dated June 2, 1903.

Application filed June 25, 1901. Serial No. 65,909. (No model.)

*To all whom it may concern:*

Be it known that I, CHARLES B. SMITH, a citizen of the United States, and a resident of New York city, borough of Manhattan, State of New York, have invented certain new and useful Improvements in Telephone-Exchange Systems, of which the following is a specification.

My invention relates to improvements in telephone-exchange systems, more particularly of the class utilizing a common battery for the subscribers' lines; and the objects of the invention are, among others, to provide improved means for producing a signal at central (both for calling and clearing-out signals) for testing lines, and generally to simplify the circuits and devices used in such systems.

The invention consists in the novel details of improvement that will be more fully hereinafter set forth and then pointed out in the claims.

In the accompanying drawing, which is a diagrammatic view of a switchboard and telephone-lines embodying my invention, the letters A B indicate subscribers' stations, at which suitable telephone instruments are located, and 1 2 are telephone-lines leading from a central office C to said stations. At the subscribers' stations the lines 1 2 are normally open at the telephone switch or hook 4 and adapted to be closed thereby through the transmitter when the receiver 5 is removed from the switch or hook. The bells 6 at the stations are shown in a bridge between the lines containing a condenser 7, whereby the bells may be operated by current from a generator 8, and the battery-current will not find a circuit through them. At the switchboard at central C the lines 2 are connected with springs of the multiple jacks 9 10 and also with one pole of battery 3 through a high-resistance coil $2^a$, which is used as a choke-coil to prevent cross talk on the lines, and the lines 1 are connected to the opposite pole of the battery and include relays $1^a$. The relay $1^a$ is adapted to close the local circuit of a signaling-lamp 14 through the contacts $9^a$ $9^b$ $10^a$ $10^b$ of the multiple jacks, the circuit leading by conductor 16 to battery 3 and back to the armature of the relay. The test-thimbles of jacks 9 10 are normally connected to one pole of battery 3 through the armature of relay $1^a$, as indicated. The tips of the plugs 17 18 are adapted to engage the springs of the jacks, that are connected with the lines 2, and the sleeves of the plugs are adapted to engage thimbles 12 13. In the illustration the plugs 17 18 are respectively the calling and answering plugs, and the strand 19, connecting their tips, includes the calling-key 20. The latter is connected by a line 21, which includes the generator 8, with the lines 1. The strand 19 is also connected by a line 22 with the pole of battery 3, which is connected with lines 2, and the line 22 includes the primary coil of an induction or repeating coil 23. The line 22, at a point between the strand 19 and said primary coil, is connected by a line 24 with lines 1, and the line 24 includes the secondary coil of induction-coil 23 and a condenser 25. For producing certain signals for the operator at central the sleeves of the plugs are connected together by a line 26, which includes signaling instruments or lamps 27 $27^a$, that will operate, as hereinafter explained, in conjunction with the thimbles 12 13, line 26 being connected by line 22 with one side of battery 3.

The operation of my invention may be described as follows: The subscriber B removes his receiver from its hook, whereupon a closed metallic circuit of high resistance relative to the talking-circuit is established through the coil $2^a$ and battery 3, including the relay $1^a$. The circuit of the signaling instrument 14 is thereby established through the appropriate springs of the jacks, the armature of the relay, and the battery 3, including line 16. The operator responds by placing plug 18 in jack 10, thereupon breaking the circuit of the instrument 14 and establishing circuit with line 2 through the repeating-coil 23, which shunts the coil $2^a$ and operates the listening-key 28, and learns the connection desired. At the same time circuit is established for signaling instrument $27^a$ at 12. After learning the connection desired the operator tests the line of the desired subscriber by touching the tip of plug 17 to a thimble 13 of said subscriber's lines. Should the line be in use, a circuit will be established through the operator's head-receiver as follows: from the tip 17 and thimble 13 through the sleeve of the plug in use and thence through its lines 26, a lamp 27, line 22, through the battery 3, line 24, through the head-receiver and line 19 back to the tip 17. A signal will thus be produced in the head-receiver indicating that the line is busy. If, however, the line is idle, the operator will receive no signal in the head-receiver, because the test-thimbles will then be connected to the same side of the battery 3 as the head-receiver. The operator thereupon inserts the plug in the jack 9 of the desired line, establishing circuit between the tip and line 2 and breaking the circuit at $9^a$ $9^b$ of the lamp 14. The sleeve of plug 17 now being in circuit, the thimble 13 closes the circuit of lamp 27 through thimble 13, the armature of relay $1^a$, and over line 1, through battery 3, lines 22 and 26, and lamp 27 back to the sleeve. The lamp 27 now becomes lighted. The operator then operates ringing-key 20 and throws current from generator 8 upon the subscriber's lines through his bell 6. When the called subscriber removes his receiver from its hook, the relay $1^a$ breaks the circuit of light 27, indicating to the operator that the subscriber has answered the call, and the two subscribers will be in telephonic communication over a metallic circuit as follows: from the switch-hook of the calling station—say B—over lines 1 to the hook of the called station, thence through line 2 of the called subscriber, cord-strand 19, and line 2 of the calling subscriber back to his hook. The battery is now bridged across the circuit just described through line 22 and repeating-coil 23, shunting the coil $2^a$. The fluctuations in the current from the telephone instruments at station B pass through the primary of the repeating-coil and will be repeated through the secondary, through the telephone instrument at station A, through the line 24 over the circuit described, and the fluctuations from the telephone instrument in station A will in like manner be repeated by the repeating-coil in the instrument in station B. When the subscribers restore their receivers to their hooks, the respective lamps 27 $27^a$ will become lighted as follows: The relay $1^a$ of station A will release its armature, which will establish circuit from line 1 through thimble 13 and thence through the sleeve of plug 17, through light 27, line 22, and battery 3 to line 1, and the lamp 27 will become lighted. In similar manner the lamp $27^a$ will become lighted when the receiver at station B is placed upon the hook. The operator will then remove the plugs from the jacks.

I do not limit my invention to the precise arrangements shown, as they may be varied without departing from the spirit thereof.

Having now described my invention, what I claim is—

1. A telephone system comprising a plurality of subscribers' lines respectively connected together at a central office, a battery and a retarding-coil bridged between said lines, telephone instruments at subscribers' stations for connection with said lines, and means at central for connecting two of said lines and thereby shunting the retarding-coil and leaving the battery in circuit with said lines, substantially as described.

2. In a telephone system, a plurality of subscribers' lines leading to a central office respectively connected together thereat, a bridge between said lines including a battery and a high-resistance coil, a plug-cord circuit, means for connecting it with one side of said lines, and a bridge between the other side of said lines and the strand of said plug-cord circuit including said battery, and having a resistance therein to provide a path for the current of a lower resistance than the resistance of the first-mentioned bridge, substantially as described.

3. A telephone-exchange system comprising telephone-lines leading from subscribers' stations to a central office and respectively connected together thereat, a battery connected to said lines, a relay on one side of each of the subscribers' lines, jacks connected with the other side of said lines, and a local circuit controlled by the corresponding relay and including a signaling instrument and contacts controlled by the springs of the jacks, the local circuit also including a battery, substantially as described.

4. A telephone-exchange system comprising telephone-lines leading from subscribers' stations to a central office and respectively connected together thereat, a battery connected to said lines, a relay on one side of each of the subscriber's lines, jacks connected with the other side of said lines, a local circuit controlled by the corresponding relay and including a signaling instrument and contacts controlled by the springs of the jacks, the local circuit also including a battery, thimbles associated with the jacks, and a line for the thimbles normally connected to one side of the battery through the armature of the corresponding relay, substantially as described.

5. A telephone-exchange system comprising subscribers' lines leading to a central office and respectively connected together thereat, jacks connected only with one side of each line, and a relay connected with the other side of each line, the thimbles of said jacks having a line controlled by the armature of the corresponding relay, substantially as described.

6. A telephone-exchange system comprising pairs of subscribers' lines leading to a central office and respectively connected together thereat, jacks connected to one side of each subscriber's line, a relay connected to the other side of each of said lines, a local circuit for each subscriber's line including a signaling instrument and contacts controlled by the corresponding jacks, the armature of the corresponding relay controlling said local line, the circuit of the thimbles for the jacks also being controlled by the armature of the corresponding relay, the springs of the jacks controlling the contacts of the corresponding local circuit, a battery bridged between the pairs of lines, means for connecting corresponding sides of subscribers' lines and establishing a bridge between two sides of the connected lines including the battery, and an induction-coil having its primary coil in such bridge, substantially as described.

7. A telephone system comprising lines leading from subscribers' stations to a central office and respectively connected together thereat, a battery bridged between said lines, jacks connected with one side of the subscribers' lines, a plug-cord circuit having plugs to connect with said jacks, a bridge between the strand of said plug-cord circuit and one side of the subscribers' lines including the battery, an induction-coil having its primary coil included in said bridge, a second bridge between the strand of the plug-cord circuit and the same side of the subscribers' lines to which the said plug-cord bridge is connected, the secondary coil of said induction-coil being included in said bridge, substantially as described.

8. A telephone-exchange system comprising telephone-lines leading from subscribers' stations to a central office and respectively connected together thereat, a battery bridged between said lines, a relay on one of the sides of each subscriber's lines, jacks on the other side of said lines, and a local circuit including a signaling instrument and leading in series through contacts of the jacks, said local circuit being controlled by the armature of the corresponding relay, substantially as described.

CHAS. B. SMITH.

Witnesses:
T. F. BOURNE,
M. MANNING.